US012744724B2

(12) United States Patent
Rodriguez

(10) Patent No.: US 12,744,724 B2
(45) Date of Patent: Sep. 22, 2026

(54) COMMUNICATIONS PATH FINDING

(71) Applicant: Ford Global Technologies, LLC, Dearborn, MI (US)

(72) Inventor: Cristian Rodriguez, Ottawa (CA)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 18/609,010

(22) Filed: Mar. 19, 2024

(65) Prior Publication Data

US 2025/0300926 A1 Sep. 25, 2025

(51) Int. Cl.
*H04L 45/122* (2022.01)
*H04L 45/00* (2022.01)

(52) U.S. Cl.
CPC ............ *H04L 45/122* (2013.01); *H04L 45/14* (2013.01)

(58) Field of Classification Search
CPC ..... H04L 45/12; H04L 45/121; H04L 45/122; H04L 45/125; H04L 45/126; H04L 45/14; H04L 45/20; H04L 45/22; H04L 45/24; H04L 45/34; H04L 67/12
See application file for complete search history.

(56) References Cited

U.S. PATENT DOCUMENTS

| | | | | |
|---|---|---|---|---|
| 10,298,488 | B1 | 5/2019 | Wood et al. | |
| 10,553,224 | B2 * | 2/2020 | Klejsa | G10L 19/22 |
| 11,757,768 | B1 * | 9/2023 | Zhou | H04L 45/38 370/392 |
| 2018/0097725 | A1 | 4/2018 | Wood et al. | |
| 2020/0389387 | A1 * | 12/2020 | Magzimof | H04L 45/16 |
| 2022/0097736 | A1 * | 3/2022 | Lin | B60W 60/0015 |
| 2022/0197881 | A1 * | 6/2022 | Dutertre | H04L 45/48 |
| 2022/0417147 | A1 * | 12/2022 | Woodworth | H04L 45/08 |
| 2024/0323660 | A1 * | 9/2024 | Wright | H04W 4/40 |

FOREIGN PATENT DOCUMENTS

| | | | |
|---|---|---|---|
| CN | 102411499 | A | 4/2012 |
| CN | 106161633 | A | 11/2016 |

OTHER PUBLICATIONS

Autosar, "Guidelines for the use of the C++language in critical and safety-related systems", Autosar AP Release 18-10, Oct. 24, 2018.
Tarjan et al., "Finding Strong Components Using Depth-First Search", arXiv:2201.07197v3 [cs.DS] Apr. 11, 2022.

* cited by examiner

*Primary Examiner* — Kostas J Katsikis
(74) *Attorney, Agent, or Firm* — Christopher Storms; Brooks Kushman P.C.

(57) ABSTRACT

A computer that includes a processor and a memory, the memory including instructions executable by the processor to identify a communications node, included in a network for a first computer network that includes network device nodes, that includes connectivity to second computer network and identify a source node included in the network device nodes. The instructions can include instructions to execute a non-recursive algorithm on a list of network paths in the first computer network that connect the source node to the communications node; identify, from the list of network paths, a preferred network path that includes a fewest number of nodes between the source node and the communications node and communicate from the source node to the second computing network via the preferred network path and the communications node.

20 Claims, 5 Drawing Sheets

COMMUNICATIONS PATH FINDING

BACKGROUND

Computers can operate systems including vehicles, robots, drones, and/or object tracking systems. Data can be acquired by sensors, processed by computers, and sent to controllers to operate a system by communicating via a network. The network can include nodes that communicate with external computing networks such as the Internet to acquire data and communicate status.

DETAILED DESCRIPTION

Figure 1:
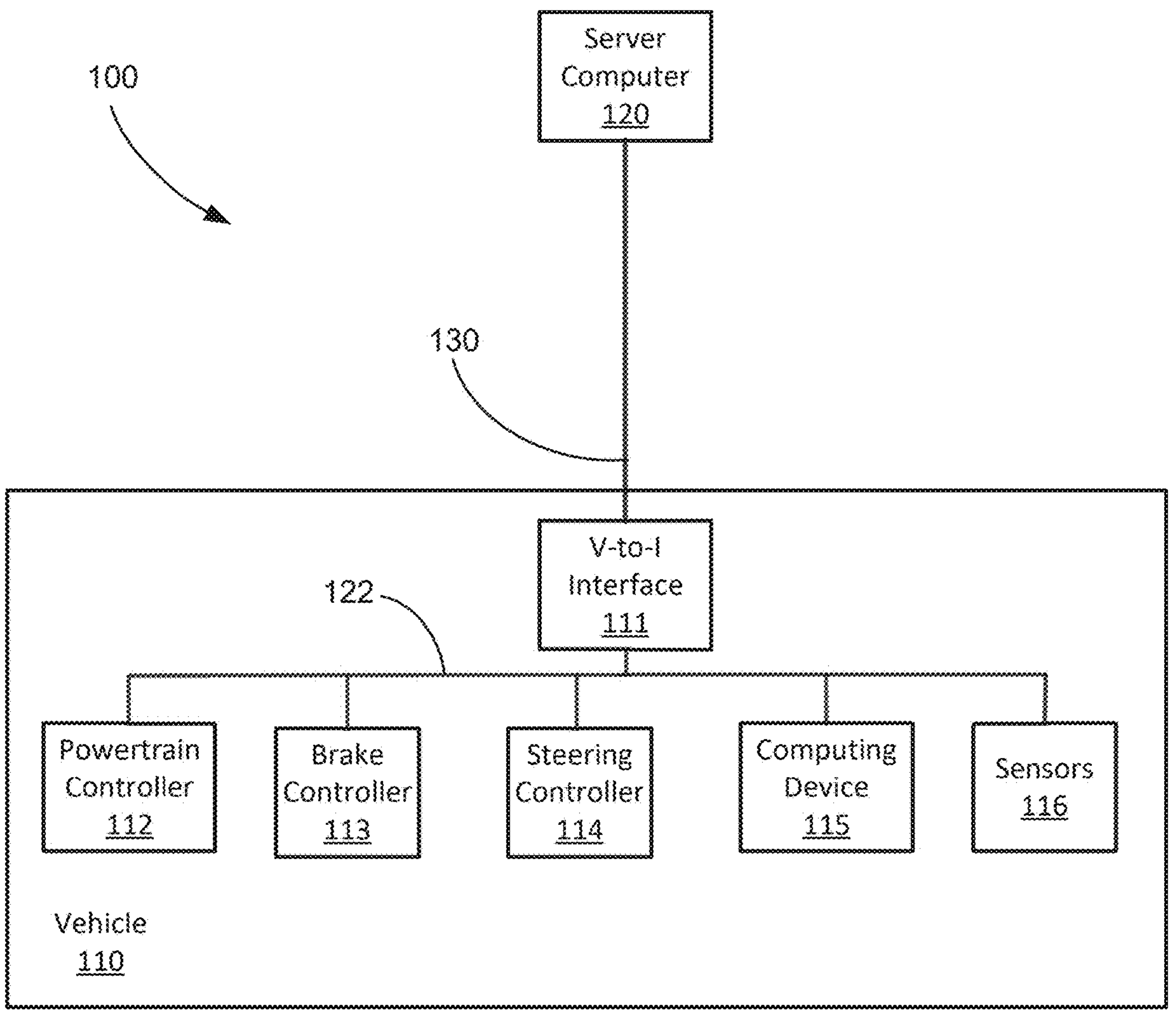
FIG. 1 is a block diagram of an example vehicle system.

Systems that move and/or that have mobile components, including vehicles, robots, drones, cell phones etc., can be operated by acquiring sensor data, and processing the sensor data to determine data regarding an environment around the system. For example, a robot could determine the location of another nearby robot's arm. The determined robot arm location could be used by the robot to determine a path upon which to move a gripper to grasp a workpiece without encountering the other robot's arm. In another example, a vehicle could determine a location of another vehicle traveling on a roadway. The vehicle could use the determined location of the other vehicle to determine a path upon which to operate while maintaining a predetermined distance from the other vehicle. Vehicle operation will be used herein as a non-limiting example of system operation in the description below.

Vehicles can include devices such as sensors, computers, and controllers, all communicatively connected by a network. Each device included in the network is referred to herein as a node. The network elements that connect the nodes of a network are referred to herein as edges. A network is composed of nodes connected by edges. A network path is the list of edges and includes nodes that communicatively connect two nodes of the network. Network topology is the arrangement of nodes and edges. Network topology can be cyclic, where two nodes can be connected by more than one path, or acyclic, where nodes of the network are connected by only one path. An example of a cyclic network is a ring network, and an example of an acyclic network is a tree network. Networks can include cyclic portions and acyclic portions.

Vehicle networks can include devices that communicate with external computing networks such as the Internet, traffic infrastructure systems, or ad hoc networks that include nearby vehicles. External computing networks can provide data such as maps to enhance vehicle navigation, data regarding traffic to enhance vehicle operation, and permit vehicles to transmit status and location data, for example. Networks that link devices included in vehicle can include wired networks and links to external computing networks can be wireless. Wired and wireless network connections are discussed below in relation to FIG. 1. Wireless network connections can be included in a communications node which can include a computing device. More than one type of wireless network connection can be included in a communications node.

Techniques for communications path-finding described herein can enhance communications with external computing networks by identifying the nodes of a network that include the types of active communications links available in the nodes of a vehicle network. Network paths which connect a source node which originates a communications request with active communications links of the type requested communications can be determined with a non-recursive network search algorithm. The identified paths can be then compared to identify the path that includes the highest bandwidth and lowest delay, for example, to provide the most efficient path for communication between the source node and the external computing network.

Disclosed herein is a method including identifying a communications node, included in a network for a first computer network that includes network device nodes, that includes connectivity to an external computer network and identifying a source node included in the network device nodes. A non-recursive algorithm can be executed on a list of network paths in the first computer network that connect the source node to the communications node, and, from the list of network paths, a preferred network path can be identified that includes a fewest number of nodes between the source node and the communications node. The source node can communicate to the external computing network via the preferred network path and the communications node. The first computer network can include a vehicle communications system that can include one or more of a controller area network and an ethernet network.

The list of nodes can include the communications node and a second communications node that includes connectivity to the external computer network. The external computer network can include the Internet. The non-recursive algorithm can include a depth first search. The communications node can include a plurality of types of connectivity to the external computer network. Determining the communications node that includes connectivity to the external computer network can include determining that a specified type of connectivity is available for communication. The types of connectivity to the external computer network can include Wi-Fi connectivity, cellular connectivity, and wired connectivity. The non-recursive algorithm can include a first stack that includes the network device nodes. The non-recursive algorithm can include a second stack that includes lists of network device nodes. The first network can include acyclic graphs and cyclic graphs. The first computer network can be included in a vehicle. The non-recursive algorithm can include pushback( ), back( ), and popBack( ) operations. The non-recursive algorithm can include a nodes to visit stack.

Further disclosed is a computer readable medium, storing program instructions for executing some or all of the above method steps. Further disclosed is a computer programmed for executing some or all of the above method steps, including a computer apparatus, programmed to identify a communications node, included in a network for a first computer network that includes network device nodes, that includes connectivity to an external computer network and identify a source node included in the network device nodes. A non-recursive algorithm can be executed on a list of network paths in the first computer network that connect the source node to the communications node, and, from the list of network paths, a preferred network path can be identified that includes a fewest number of nodes between the source node and the communications node. The source node can communicate to the external computing network via the preferred network path and the communications node. The first computer network can include a vehicle communications system that can include one or more of a controller area network and an ethernet network.

The instructions can include further instructions where the list of nodes can include the communications node and a second communications node that includes connectivity to the external computer network. The external computer network can include the Internet. The non-recursive algorithm can include a depth first search. The communications node can include a plurality of types of connectivity to the external computer network. Determining the communications node that includes connectivity to the external computer network can include determining that a specified type of connectivity is available for communication. The types of connectivity to the external computer network can include Wi-Fi connectivity, cellular connectivity, and wired connectivity. The non-recursive algorithm can include a first stack that includes the network device nodes. The non-recursive algorithm can include a second stack that includes lists of network device nodes. The first network can include acyclic graphs and cyclic graphs. The first computer network can be included in a vehicle. The non-recursive algorithm can include pushback( ), back( ), and popBack( ) operations. The non-recursive algorithm can include a nodes to visit stack.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate vehicle 110 based on data received from the sensors 116 and data received from the remote server computer 120. The server computer 120 can communicate with the vehicle 110 via an external computing network 130.

The computing device 115 includes a processor and a memory such as are known. Further, the memory includes one or more forms of computer readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and exterior lights, etc., as well as to determine whether and when the computing device 115, as opposed to a human operator, is to control such operations. The computing device 115 can also control the temporal alignment of lighting to sensor acquisition to account for the color effects of vehicle lights or external lights.

The computing device 115 may include or be communicatively coupled to, i.e., via a vehicle network 122 as described further below, more than one computing devices, i.e., controllers or the like included in the vehicle 110 for monitoring and controlling various vehicle components, i.e., a propulsion controller 112, a brake controller 113, a steering controller 114, etc. The computing device 115 is generally arranged for communications on a vehicle network 122, i.e., such as a controller area network (CAN), or the like; the vehicle network 122 can additionally or alternatively include wired or wireless communication mechanisms such as are known, i.e., Ethernet or other communication protocols.

Via the vehicle network 122, the computing device 115 may transmit messages to various devices in vehicle 110 and receive messages from the various devices, i.e., controllers, actuators, sensors, etc., including sensors 116. Alternatively, or additionally, in cases where the computing device 115 actually comprises multiple devices, the vehicle network 122 may be used for communications between devices represented as the computing device 115 in this disclosure. Further, as mentioned below, various controllers or sensing elements such as sensors 116 may provide data to the computing device 115 via the vehicle network 122.

In addition, the computing device 115 may be configured for communicating through a vehicle to infrastructure (V2I) interface 111 with a remote server computer 120, i.e., a cloud server, via an external computing network 130, which, as described below, includes hardware, firmware, and software that permits computing device 115 to communicate with a remote server computer 120 via an external computing network 130 such as wireless Internet (WI-FI®) or cellular networks. V2X interface 111 may accordingly include processors, memory, transceivers, etc., configured to utilize various wired and wireless networking technologies, i.e., cellular, BLUETOOTH®, Bluetooth Low Energy (BLE), Ultra-Wideband (UWB), Peer-to-Peer communication, UWB based Radar, IEEE 802.11, and other wired and wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and control various vehicle 110 components and operations. For example, the computing device 115 may include programming to govern or control vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and amount of time between vehicles, lane change, minimum gap between vehicles, left turn across path minimum, time to arrival at a particular location and intersection (without signal) minimum time to arrival to cross the intersection.

Controllers, as that term is used herein, include computing devices that typically are programmed to monitor and control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and other sensors 116 and the geographical coordinates provided by the GPS sensor may be used by the computing device 115 to operate the vehicle 110 autonomously or semi autonomously, for example.

The vehicle 110 is generally a land based vehicle 110 capable of autonomous and semi-autonomous operation and having three or more wheels, i.e., a passenger car, light truck, etc. Vehicle 110 includes one or more sensors 116, the V2I interface 111, the computing device 115 and one or more controllers 112, 113, 114. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via an external computing network 130, with the vehicle 110 V2I interface 111 and computing device 115, and therefore these features will not be described further to reduce redundancy. A server computer 120 can be used to develop and train software that can be transmitted to a computing device 115 in a vehicle 110.

Figure 2:
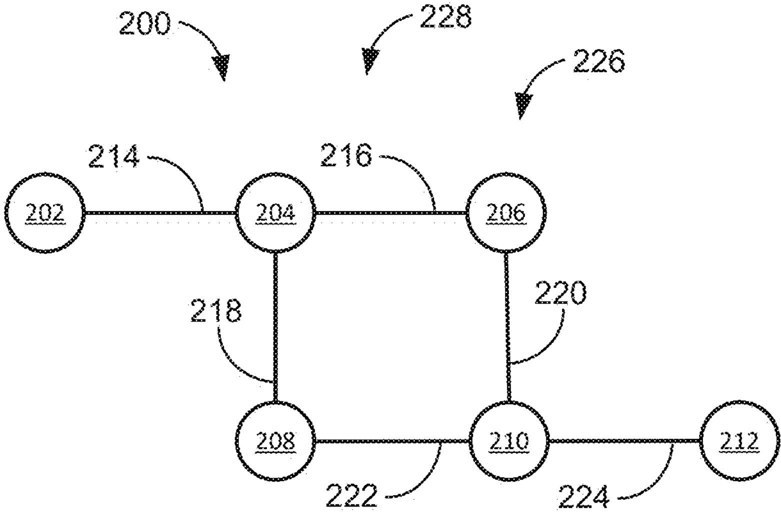
FIG. 2 is a diagram of an example vehicle network.

FIG. 2 is a diagram of an example vehicle network 200. Vehicle network includes nodes 202, 204, 206, 208, 210, 212 (collectively referred to as nodes 226), and edges 214, 216, 218, 220, 222, 224 (collectively referred to as edges 228). Nodes 226 can include computing devices 115, sensors 115, controllers 112, 113, 114, V2I interfaces 111, and other devices such as are known. Edges 228 are wired or wireless connections that communicate data from one node 226 to another node 226. A node 226 can receive data via an edge 228 and input the data to devices internal to the node 226. A node 226 can also receive data via a first edge 228 and pass the data on to another node 226 via a second edge 228. In this fashion any node 226 in vehicle network 200 can communicate with any other node 226 in the vehicle network 200 via multiple edges 228 and multiple nodes 224. The nodes 226 and edges 228 used to communicate from a first node 226 to a second node 228 is referred to herein as a network path.

Note that because vehicle network 200 is cyclic, more than one path can connect a first node 226 to a second node 226. For example, node 204 can communicate with node 210 via a first path that includes edges 216, 220 and node 206 or a second path that includes edges 218, 222 and node 208. Different paths in a vehicle network 200 can have respective different efficiencies indicated by the length of time required to send data from a first node 226 to a second node 226 on the network. The length of time required to send data from a first node 226 to a second node 226 on a path can depend upon the number of edges 228 and the number of nodes 226 traversed in sending the data on the path. In addition to the number of edges 228 and the number of nodes 226 traversed, the length of time required to send the data on a path can depend upon the processing speed of each node 226 traversed. In transferring data from a first edge 228 to a second edge 228, a node 224 can receive the data from a first edge 228, make a copy of the data in memory, and output the data from memory to the second edge 228. The length of time required to transfer the data can depend upon the number and length of the edges 228 traversed and the speed and availability of computing resources in the nodes 226 performing the transfer. These factors can be summarized as bandwidth and delay, which indicate the number of bits of data per unit time that can be transferred by the network and the total amount of time required to transfer a message.

Vehicle networks 200 can include multiple nodes 226 that seek to communicate with external computing networks 130. For example, a computing device 115 included in a vehicle network 200 can seek to download map data from a server computer 120 via the Internet. The vehicle network 200 may have multiple V2I interfaces 111 included in multiple nodes 226 of the vehicle network 200 while not all of the V2I interfaces are actively connected to the Internet at any given time. A given node 226 can have multiple types of interfaces each connected to a different type of external computing network.

Techniques described herein can enhance communications with external computing networks for vehicle networks by determining which types of V2I interfaces 111 are available at which nodes 226 in a vehicle network 200 and then determine the most efficient path for communicating from a source node 226 to an available V2I interface 111 based on a non-recursive depth first search (DFS) algorithm. Non-recursive DFS algorithms can enhance communications with external computing networks 130 by searching a vehicle network 200 without requiring recursion. Recursion refers to a style of programming that performs a repetitive action such as graph searching by creating a recursive function that can call itself. Each time the recursive function calls itself, it keeps track of its current location within the graph by pushing internal variables indicating the state of the search onto a function call stack. When a search of a portion of the graph is complete, the recursive function can return the results to the previous instance of the recursive function by returning execution to the calling instance of the recursive function and popping the stack variables from the top of the function stack.

Recursive functions can make coding repetitive functions such as DFS graph searching easier and less error prone for the coder because the recursive function can be coded and debugged only once. Once the recursive function is coded and debugged, the runtime function call stack handling capability of a computing device 115 keeps track of the data structures used to return and store the results of the repetitive algorithm, for example. Keeping track of the data structures used to return and store the results of a repetitive algorithm requires computing resources including instructions and memory to store and retrieve the function calls and stack variables. Techniques described herein can use non-recursive function calls and global stack variables that do not require repetitive storage and retrieval to perform DFS. Non-recursive DFS algorithms can require greater effort and care in coding to ensure error-free operation but can yield equivalent results to recursive algorithms while requiring fewer computing resources to execute.

Figure 3:
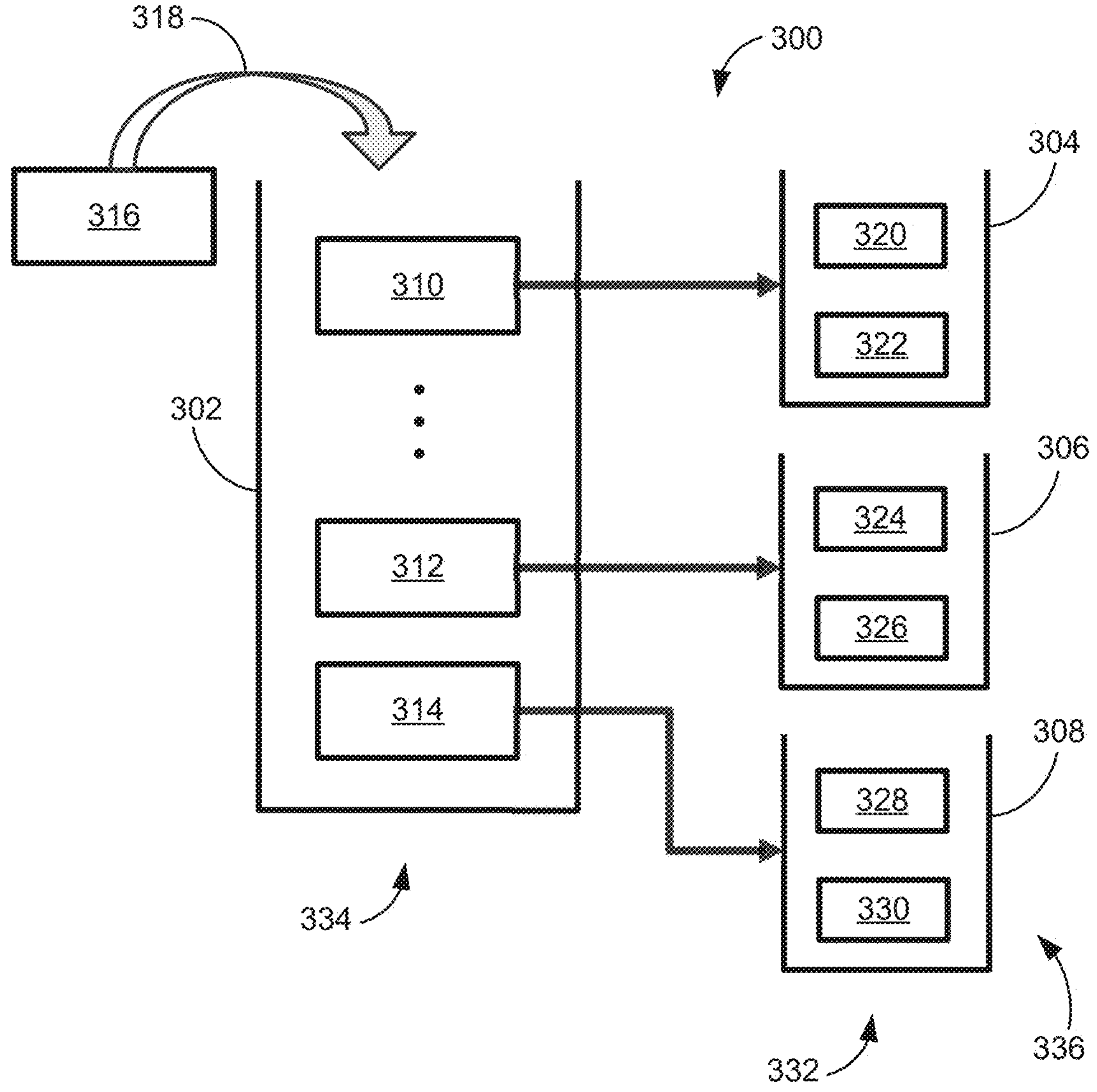
FIG. 3 is a diagram of example network node stacks.

FIG. 3 is a diagram of node stack data structures 300 that support a non-recursive DFS algorithm. Node stack data structures 300 are included in computing device 115 memory and include a stack of stacks 302 and node stacks 304, 306, 308 (collectively, node stacks 336). Node stacks 336 are data structures that include node references 320, 322, 324, 326, 328, 330, collectively node references 334. Node references 334 are memory pointers to nodes 226 in computing device 115 memory. A stack of stacks 302 is a data structure that includes stack references 310, 312, 314, collectively stack references 334. Stack references 334 are memory pointers that indicate node stacks 336, respectively.

A stack is a data structure that supports at least pushBack( ), back( ), and popBack( ) operations. PushBack( ), back( ), and popBack( ) are memory operations that store or recall node references 334 to or from node stacks 336 or stack references 334 to or from a stack of stacks 302, respectively. The pushBack( ) operation is illustrated in FIG. 3 by stack reference 316 and arrow 318. Performing a pushBack( ) operation on stack reference 316 moves stack reference 316 onto the top position of stack of stacks 302. In similar fashion, the popBack( ) operation removes the top stack reference 334 from stack of stacks 302. The back( ) operation copies the top stack reference 334 from stack of stacks 302 without removing it. Node references 334 are similarly added, copied, or removed from node stacks 304, 306, 308, respectively by the pushBack( ), back( ), and popBack( ) operations.

By restricting access to stack of stacks 302 and node stacks 336 to pushBack( ), back( ), and popBack( ) operations, the order in which stack references 334 and node references 334 are added and removed from stack of stacks 302 and node stacks 336 is maintained. Maintaining the order in which stack reference 334 and node references 334 are added and removed from stack of stacks 302 and node stacks 336 permits a non-recursive DFS algorithm to mimic the operation of a recursive algorithm without requiring computer resource-consuming recursive function calls.

Figure 4:
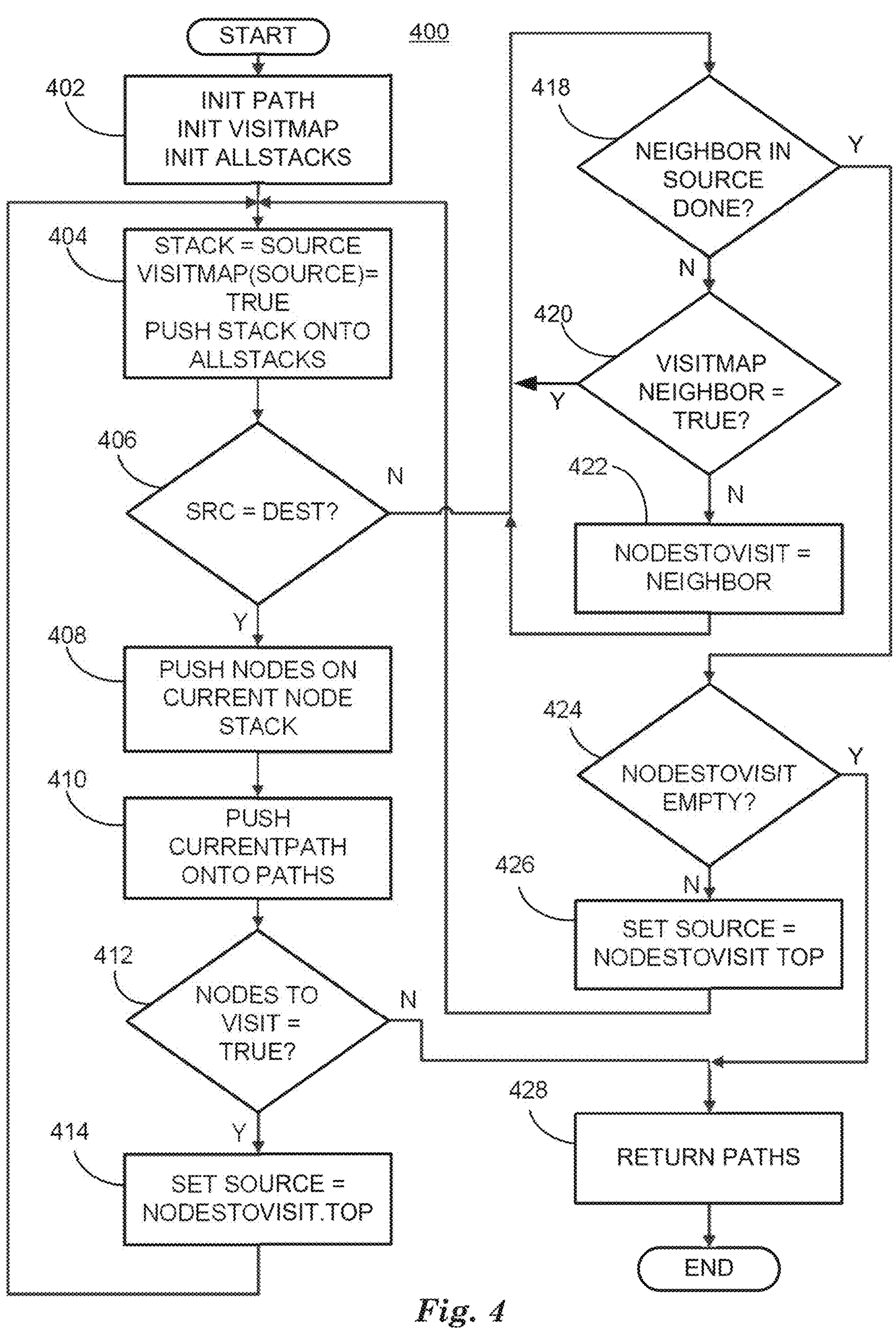
FIG. 4 is a flowchart diagram of an example process to identify network paths.

FIG. 4 is a flowchart diagram of a process 400 for a non-recursive DFS of a vehicle network 200 to determine paths that connect a communication originating node 226, called the source, to a communications node 226 that includes a specific connectivity type, called the destination, on a vehicle network 200, called the graph G. Process 400 can be implemented on a computing device 115 included in a vehicle 110. Process 400 includes multiple blocks that can be executed in the illustrated order. Process 400 could alternatively or additionally include fewer blocks and can include the blocks executed in different orders.

Process 400 is called from a communication process 500, described below in relation to FIG. 5, that can execute on a computing device 115 included in any node 226 of a vehicle network 200. The communication process 500 can receive a message from a source node 226 requesting communications with an external computing network 120 with a selected type of connectivity. Process 400 is then called for each destination node 226 that includes the selected type of active connectivity to determine the network paths that connect the source node 226 to the destination node 226. Process 400 performs a non-recursive DFS on the vehicle network 200 to determine a stack of paths where each path is a stack reference that points to a stack that includes a list of nodes 336 that connect the source node 226 to a destination node 226.

Process 400 begins at block 402, where computing device 115 enters process 400 with a source node 336, a destination node 336, and a list of nodes 336 in graph G based on a vehicle network 200. A visit map stack 332 includes a list of all nodes 336 in a vehicle network 200 and a Boolean variable associated with a respective node, that indicates whether the node 336 has been visited by process 400, is initialized to false.

At block 404 the main processing loop for process 400 begins. A stack of stacks 302 that includes paths is initialized to zero and a current stack node 336 is set equal to the current source node 336 and the Boolean included in the visit map stack 332 for the current stack node 336 is set to true.

At block 406 computing device 115 checks the current stack node 336 to see if the current stack node 336 is equal to the destination node 336. If the current stack node 336 is equal to the destination node 336, the current path is complete and process 400 passes to block 408. If the current stack node 336 does not equal the destination node 336, process 400 passes to block 418 to add nodes 336 to the nodes to visit stack 332.

At block 408 nodes from the nodes to visit stack 332 are pushed onto the current node stack 332.

At block 410 a stack reference 334 that indicates the current node stack 336 is pushed onto the paths stack of stacks 302.

At block 412 computing device 115 checks to see if there are nodes 336 left to visit by checking nodes to visit stack 332 by testing the Booleans included in the nodes to visit stack 332. If all nodes 336 have been visited, process 400 branches to block 428. If all nodes 336 have not been visited, process 400 branches to block 414.

At block 414 the source node is set to the node at the top of the current node stack 336 and process 400 returns to block 404 to begin the next current node stack 336.

At block 418 process 400 begins a for loop including blocks 418, 420, 422 that sets the value of the neighbor node 336 to the next neighbor of the current source node 336 until all the neighbor nodes 336 of the current source node 336 have been examined. A node 336 is a neighbor node 336 of a source node 336 in a graph G if an edge 228 connects the neighbor node 336 to the source node 336. If the neighbor node 336 is non-null, process 400 passes to block 420. When the end of the neighbor nodes 336 of source node 336 is reached, process 400 passes to block 424.

At block 420, computing device 115 checks the Boolean of the neighbor node 336 to in the visit map stack 332 to determine if the neighbor has been visited by process 400. If the neighbor node 336 has been visited, process 400 passes to block 418 to check the next neighbor node 336 of source node 336. If the neighbor has not been visited, If the value n process 400 passes to block 422.

At block 422 the neighboring node 336 has not been visited and computing device 115 pushes the neighbor node 336 onto the top of a nodes to visit stack 332. Following block 422 process 400 passes to block 418 to check for the next neighbor node 336 of source node 336.

At block 424 computing device 115 checks the visit map stack 332 to determine if any nodes 336 remain to be visited. If any nodes 336 in the visit map stack 332 remain to be visited, process 400 passes to block 426. If no nodes 336 remain to be visited, process 400 passes to block 428.

At block 426 computing device 115 sets the source node 336 equal to the top of the nodes to visit stack 332 and returns to block 404 to begin processing the next source node 336.

At block 428 computing device 115 has filled the paths stack of stacks 334 with all paths that connect the source node 336 to the destination node 336 and process 400 returns the paths and ends following block 428.

Figure 5:
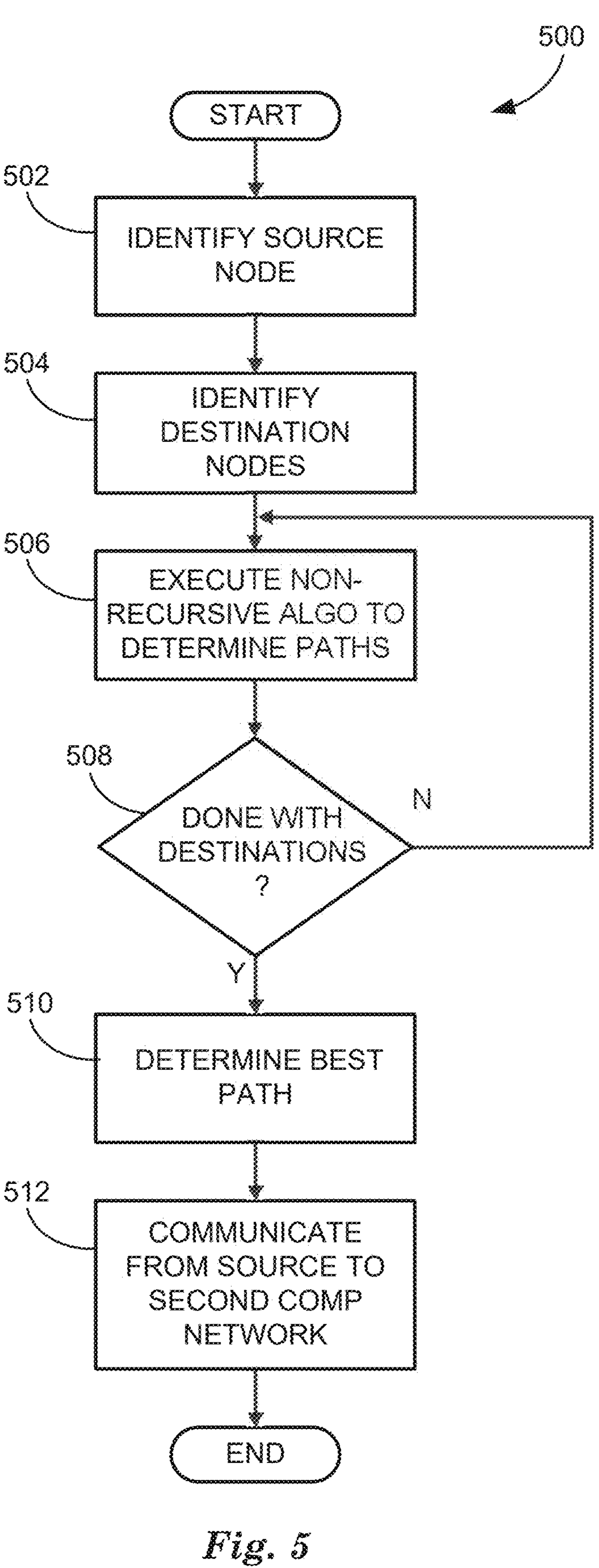
FIG. 5 is a flowchart diagram of an example process to identify network nodes with connectivity.

FIG. 5 is a flowchart of a process 500 for determining a path for communicating from a source node 336 in a vehicle network 200 to an external computing network 130 via a communications node 336. Process 500 can be implemented in a computing device 115, for example. Process 500 includes multiple blocks that can be executed in the illustrated order. Process 500 could alternatively or additionally include fewer blocks and can include the blocks executed in different orders.

Process 500 begins at block 502, where a computing device 115 identifies a source node 336. The source node 336 can be identified by determining that a process executing on a node 336 is requesting communication with an external computing network 130. For example, a navigation program can request map data from the Internet.

At block 504 computing device 115 identifies a list of one or more destination nodes 336 that include an active V2I interface 111 of the communications type indicated by the source node 226. For example, if source node 226 is requesting Internet communications, computing device 115 could determine destination nodes 336 to be the nodes 226 in the vehicle network 200 that include an active Internet connection.

At block 506 computing device 115 calls process 400 as described in relation to FIG. 4 with the source node 226, the next destination node 226 of the list of destination nodes 336 and a graph G that describes the vehicle network 200. Process 400 returns a stack of stacks 302 that includes stack references 334 that indicate paths that connect source node 336 with a destination nodes 336 that includes an active V2I interface 111 of the appropriate communications type. Process 500 can determine which nodes 226 of a vehicle network 200 include active external computing network 120 connectivity of the type selected by source node 226 by sending messages to each node 226 of the vehicle network 200 inquiring whether a node 226 has an active communication link of the requested type with an external computing network 120. As discussed above, the communication link can include WiFi, cellular, Ethernet, etc. Active communications links in a vehicle network 200 can be discovered in similar fashion to a computer on a WiFi network, where active Internet links executing on a network can publish their network addresses and a computer seeking an Internet connection can compile a list of networks that include the Internet connections. The computing device 115 can compile a list of nodes 226 that include an active external computing network 120 with connectivity of the selected type and push the nodes 226 that include active connectivity onto a list of destination nodes 336.

At block 508 computing device 115 gets the next destination node 336 from the list of destination nodes 336. If the destination node 336 is non-null, process 500 passes to block 506 to determine the next paths from source node 336 to the current destination node 336. If the end of the destination node 336 list is reached, process 500 passes to block 510.

At block 510 computing device 115 analyzes each path in the path stack of stacks 332 to determine which path has the highest communications bandwidth and the shortest communications delay as described above to yield the most efficient communications path between the source node 336 and one of the destination nodes 336.

At block 512 the source node 336 communicates with the external communications network 130 via the communications path determined at block 510. Following block 512 process 500 ends.

Computing devices such as those described herein generally each includes commands executable by one or more computing devices such as those identified above, and for carrying out blocks or steps of processes described above. For example, process blocks described above may be embodied as computer executable commands.

Computer executable commands may be compiled or interpreted from computer programs created using a variety of programming languages and technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer readable medium, etc., and executes these commands, thereby performing one or more processes, including one or more of the processes described herein. Such commands and other data may be stored in files and transmitted using a variety of computer readable media. A file in a computing device is generally a collection of data stored on a computer readable medium, such as a storage medium, a random access memory, etc.

A computer readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:

a computer that includes a processor and a memory, the memory including instructions executable by the processor to:

identify a communications node, included in a network for a first computer network that includes network device nodes, that includes connectivity to an external computer network;

identify a source node included in the network device nodes;

execute a non-recursive algorithm on a list of network paths in the first computer network that connect the source node to the communications node, wherein the non-recursive algorithm includes a first stack of stack references to second stacks wherein the second stacks include references to the network device nodes;

identify, from the list of network paths, a preferred network path that includes a fewest number of nodes between the source node and the communications node; and communicate from the source node to the external computing network via the preferred network path and the communications node.

2. The system of claim 1, wherein the first computer network includes a vehicle communications system that can include one or more of a controller area network and an ethernet network.

3. The system of claim 1, wherein the list of nodes includes the communications node and a second communications node that includes connectivity to the external computer network.

4. The system of claim 1, wherein the external computer network includes the Internet.

5. The system of claim 1, wherein the non-recursive algorithm includes a depth first search.

6. The system of claim 1, wherein the communications node includes a plurality of types of connectivity to the external computer network.

7. The system of claim 6, wherein determining the communications node that includes connectivity to the external computer network includes determining that a specified type of connectivity is available for communication.

8. The system of claim 6, wherein the types of connectivity to the external computer network include Wi-Fi connectivity, cellular connectivity, and wired connectivity.

9. The system of claim 1, wherein the first network includes acyclic graphs and cyclic graphs.

10. The system of claim 1, wherein the first computer network is included in a vehicle.

11. A method, comprising:

identifying a communications node, included in a network for a first computer network that includes network device nodes, that includes connectivity to an external computer network;

identifying a source node included in the network device nodes;

executing a non-recursive algorithm on a list of network paths in the first computer network that connect the source node to the communications node, wherein the non-recursive algorithm includes a first stack of stack references to second stacks wherein the second stacks include references to the network device nodes;

identifying, from the list of network paths, a preferred network path that includes a fewest number of nodes between the source node and the communications node; and communicating from the source node to the external computing network via the preferred network path and the communications node.

12. The method of claim 11, wherein the first network includes acyclic graphs and cyclic graphs.

13. The method of claim 11, wherein the first computer network is included in a vehicle.

14. The method of claim 11, wherein the first computer network includes a vehicle communications system that can include one or more of a controller area network and an ethernet network.

15. The method of claim 11, wherein the list of nodes includes the communications node and a second communications node that includes connectivity to the external computer network.

16. The method of claim 11, wherein the external computer network includes the Internet.

17. The method of claim 11, wherein the non-recursive algorithm includes a depth first search.

18. The method of claim 11, wherein the communications node includes a plurality of types of connectivity to the external computer network.

19. The method of claim 18, wherein determining the communications node that includes connectivity to the external computer network includes determining that a specified type of connectivity is available for communication.

20. The method of claim 18, wherein the types of connectivity to the external computer network include Wi-Fi connectivity, cellular connectivity, and wired connectivity.

* * * * *